US012406642B2

(12) United States Patent
Morita

(10) Patent No.: US 12,406,642 B2
(45) Date of Patent: Sep. 2, 2025

(54) ELECTRONIC HI-HAT AND OPERATING METHOD OF ELECTRONIC HI-HAT

(71) Applicant: Roland Corporation, Shizuoka (JP)

(72) Inventor: Yutaka Morita, Shizuoka (JP)

(73) Assignee: Roland Corporation, Shizuoka (JP)

( * ) Notice: Subject to any disclaimer, the term of this patent is extended or adjusted under 35 U.S.C. 154(b) by 660 days.

(21) Appl. No.: 17/460,297

(22) Filed: Aug. 29, 2021

(65) Prior Publication Data

US 2022/0319475 A1 Oct. 6, 2022

(30) Foreign Application Priority Data

Mar. 30, 2021 (JP) ................................ 2021-057602

(51) Int. Cl.

*G10D 13/10* (2020.01)
*G10D 13/065* (2020.01)
*G10H 1/32* (2006.01)
*G10H 3/14* (2006.01)

(52) U.S. Cl.

CPC ........... *G10D 13/26* (2020.02); *G10D 13/065* (2013.01); *G10H 1/32* (2013.01); *G10H 3/143* (2013.01); *G10H 2220/525* (2013.01)

(58) Field of Classification Search

CPC ........ G10D 13/26; G10D 13/065; G10H 1/32; G10H 3/143; G10H 2220/525
See application file for complete search history.

(56) References Cited

U.S. PATENT DOCUMENTS 4,402,248 A * 9/1983 Pearce .................... G10D 13/02 84/411 R
4,528,888 A * 7/1985 Hoshino .............. G10D 13/065 984/154
8,692,098 B1 * 4/2014 Reinhard ............. G10D 13/065 84/422.3
2005/0145101 A1 * 7/2005 Yoshino ................... G10H 1/32 84/723

(Continued)

FOREIGN PATENT DOCUMENTS

CN 102543053 7/2012
CN 102568458 7/2012

(Continued)

OTHER PUBLICATIONS

"Office Action of China Counterpart Application", issued on Apr. 3, 2025, with English translation thereof, p. 1-p. 14.

(Continued)

*Primary Examiner* — Dedei K Hammond
*Assistant Examiner* — Philip G Scoles
(74) *Attorney, Agent, or Firm* — JCIPRNET

(57) ABSTRACT

The disclosure provides an electronic hi-hat and an operating method of the electronic hi-hat that can improve the feeling at the time of hitting. Since an edge portion of a bottom frame is formed in a flat plate shape, the weight of an outer edge portion of the bottom frame can be reduced. As a result, even if a hit top cymbal comes into contact with the bottom frame, the weight of the outer edge portion of the bottom frame is less likely to hinder the swinging (displacement caused by the hit) of the top cymbal. Therefore, the feeling at the time of hitting the top cymbal can be lightened, so that the feeling at the time of hitting can be improved.

20 Claims, 3 Drawing Sheets

(56) References Cited

U.S. PATENT DOCUMENTS

| | | | | |
|---|---|---|---|---|
| 2012/0118130 A1 | 5/2012 | Field | | |
| 2016/0019873 A1* | 1/2016 | Mori | G10H 1/00 | 84/422.1 |

FOREIGN PATENT DOCUMENTS

| | | | | |
|---|---|---|---|---|
| CN | 110462728 | | 11/2019 | |
| JP | 2005208555 | | 8/2005 | |
| JP | 2007086813 | | 4/2007 | |
| JP | 2009069848 | | 4/2009 | |
| JP | 2009128427 | | 6/2009 | |
| JP | 2009145559 | | 7/2009 | |
| JP | 2015028521 | | 2/2015 | |
| JP | 6221469 | B2 * | 11/2017 | |
| JP | 2019113824 | | 7/2019 | |
| RO | 130805 | A1 * | 12/2015 | |
| WO | WO-2020226175 | A1 * | 11/2020 | G10D 13/065 |

OTHER PUBLICATIONS

"Office Action of China Counterpart Application", issued on May 28, 2025, with English translation thereof, p. 1-p. 13.

"Decision on Rejection of China CounterpartApplication", with English translation thereof, issued on Jul. 21, 2025, pp. 1-19.

* cited by examiner (a)

(b)

(a)

(b)

ELECTRONIC HI-HAT AND OPERATING METHOD OF ELECTRONIC HI-HAT

CROSS-REFERENCE TO RELATED APPLICATION

This application claims the priority benefits of Japanese application no. 2021-057602, filed on Mar. 30, 2021. The entirety of the above-mentioned patent application is hereby incorporated by reference herein and made a part of this specification.

BACKGROUND

Technical Field

The disclosure relates to an electronic hi-hat and an operating method of the electronic hi-hat, and more particularly relates to an electronic hi-hat and an operating method of the electronic hi-hat that can improve the feeling at the time of hitting.

Description of Related Art

An electronic hi-hat is known, which includes a bottom cymbal that is swingably attached to a first rod, and a top cymbal that is swingably attached to a second rod which moves up and down with respect to the first rod. This type of electronic hi-hat is played by moving the second rod up and down to bring the top cymbal into contact with the bottom cymbal or hitting the top cymbal. During such a performance, the top cymbal and the bottom cymbal may swing in a state of being in contact with each other.

For example, Patent Document 1 describes a technique of providing a sliding tube 140 or a sliding film 212 at a contact portion between a top cymbal pad portion 100 (top cymbal) and a bottom cymbal pad portion 200 (bottom cymbal). According to this technique, when the top cymbal swings while being in contact with the bottom cymbal, the sliding of the sliding tube 140 and the sliding film 212 can smooth the swinging of each cymbal. Therefore, the feeling at the time of hitting can be close to that of hitting an acoustic hi-hat cymbal.

RELATED ART

Patent Document

[Patent Document 1] Japanese Laid-Open No. 2005-208555 (for example, paragraphs 0099, 0128, 0188, FIG. 5, and FIG. 14).

Problems to be Solved

However, in the above-mentioned conventional technique, in order to secure strength (suppress damage), besides that the outer edge portion of the bottom cymbal (bottom frame) is formed to be relatively thick, the sliding film 212 is attached to the thick portion via a metal plate 210. Therefore, the weight of the outer edge side (portion in contact with the top cymbal) of the bottom cymbal increases. Due to the increase in the weight of the bottom cymbal, the feeling at the time of hitting the top cymbal may become heavy, which causes a problem that the feeling at the time of hitting cannot be sufficiently improved.

SUMMARY

The disclosure provides an electronic hi-hat and an operating method of the electronic hi-hat that can improve the feeling at the time of hitting.

Means for Solving the Problems

An electronic hi-hat according to the disclosure includes a bottom cymbal that is swingably attached to a first rod; and a top cymbal that is arranged on an upper side of the bottom cymbal and is swingably attached to a second rod which is relatively displaced up and down with respect to the first rod. The bottom cymbal includes a first frame that forms a skeleton of the bottom cymbal, and the first frame includes a contact portion that has a flat plate shape and comes into contact with the top cymbal when the top cymbal is displaced.

An operating method according to the disclosure is provided for an electronic hi-hat, which includes a bottom cymbal that is swingably attached to a first rod, and a top cymbal that is arranged on an upper side of the bottom cymbal and is swingably attached to a second rod which is relatively displaced up and down with respect to the first rod. The bottom cymbal includes a first frame that forms a skeleton of the bottom cymbal. The first frame includes a contact portion that has a flat plate shape. The top cymbal is brought into contact with the contact portion when the top cymbal is displaced.

Figure 1:
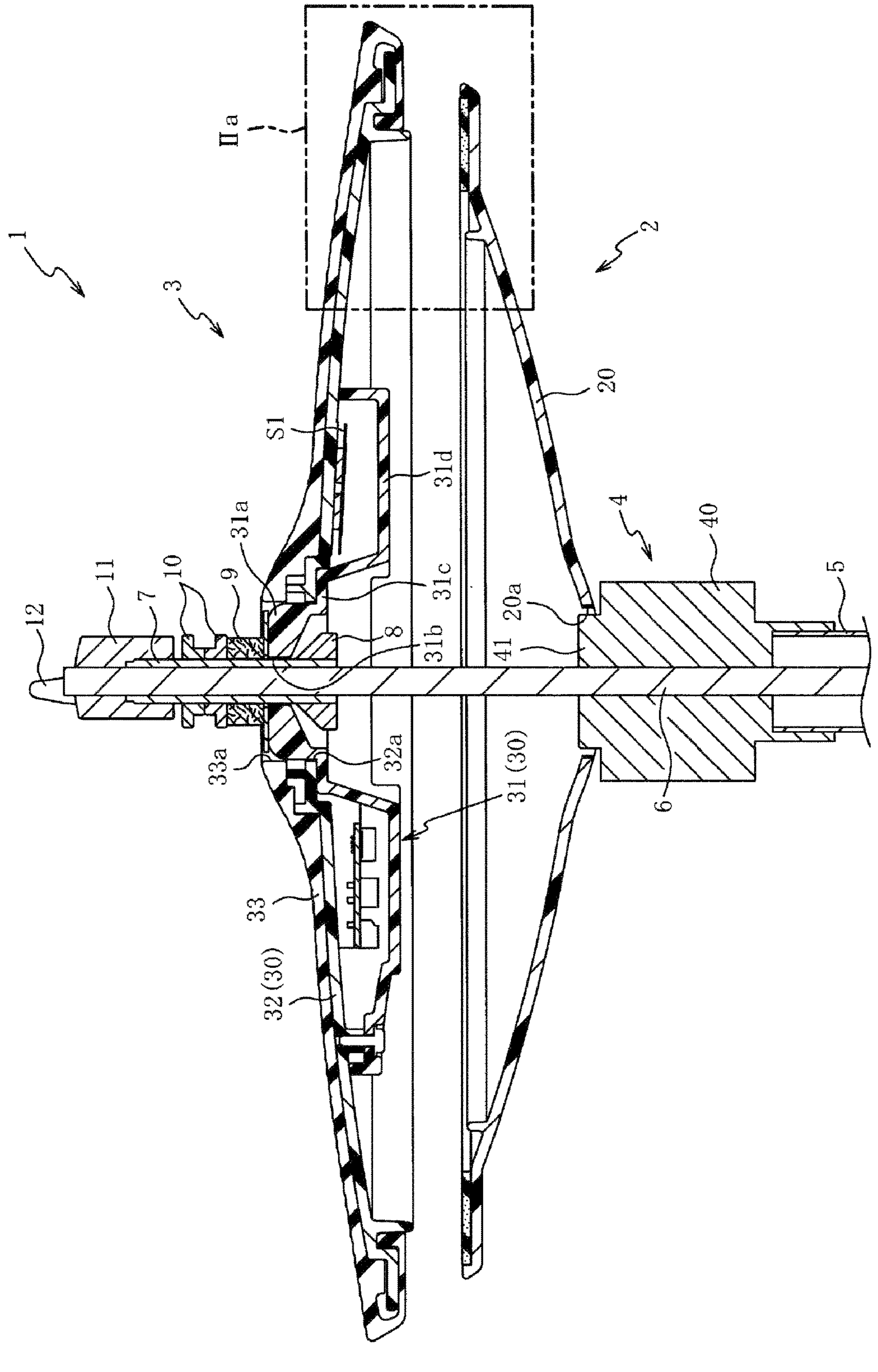
FIG. 1 is a cross-sectional view of an electronic hi-hat according to an embodiment.
Figure 2:
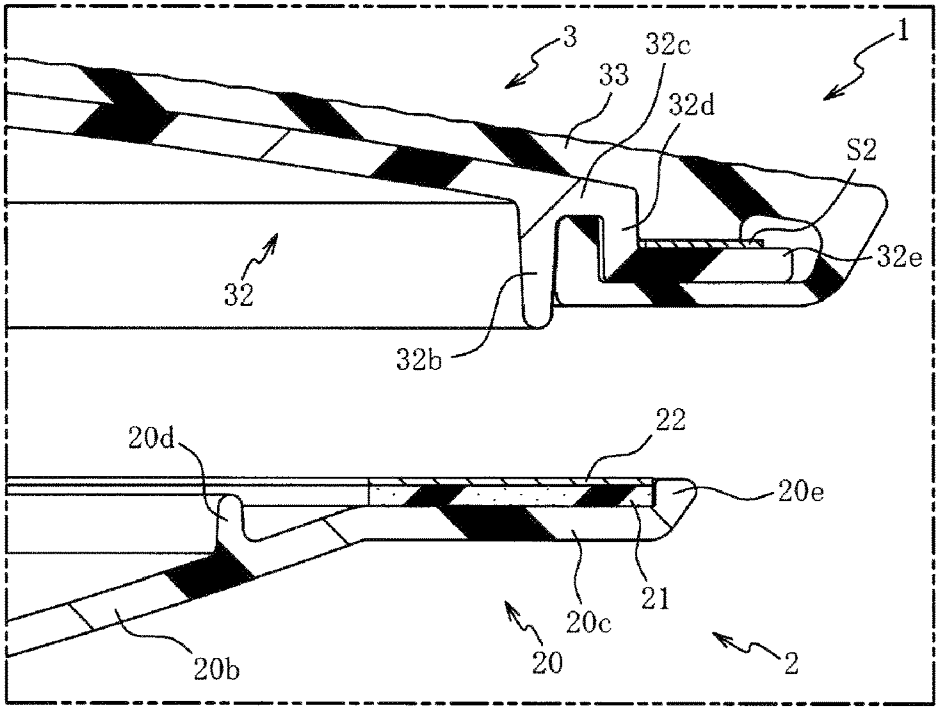
Figure 2:
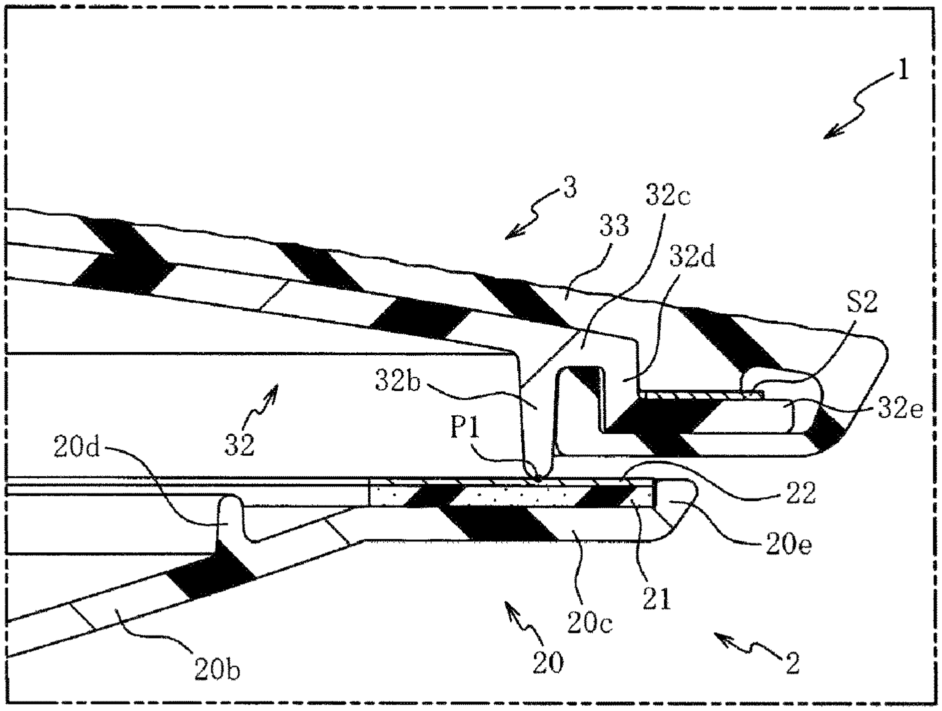

(a) of FIG. 2 is a partially enlarged cross-sectional view of the electronic hi-hat in which the IIa portion of FIG. 1 is enlarged, and (b) of FIG. 2 is a partially enlarged cross-sectional view of the electronic hi-hat showing a state where a top cymbal is closed from the state of (a) of FIG. 2.

Figure 3:
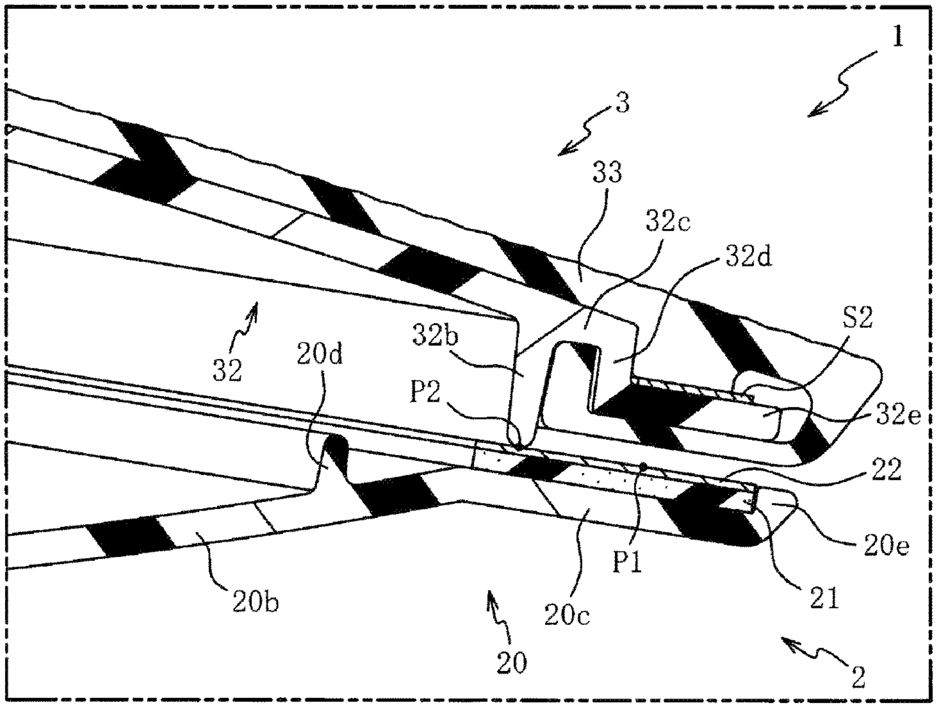
Figure 3:
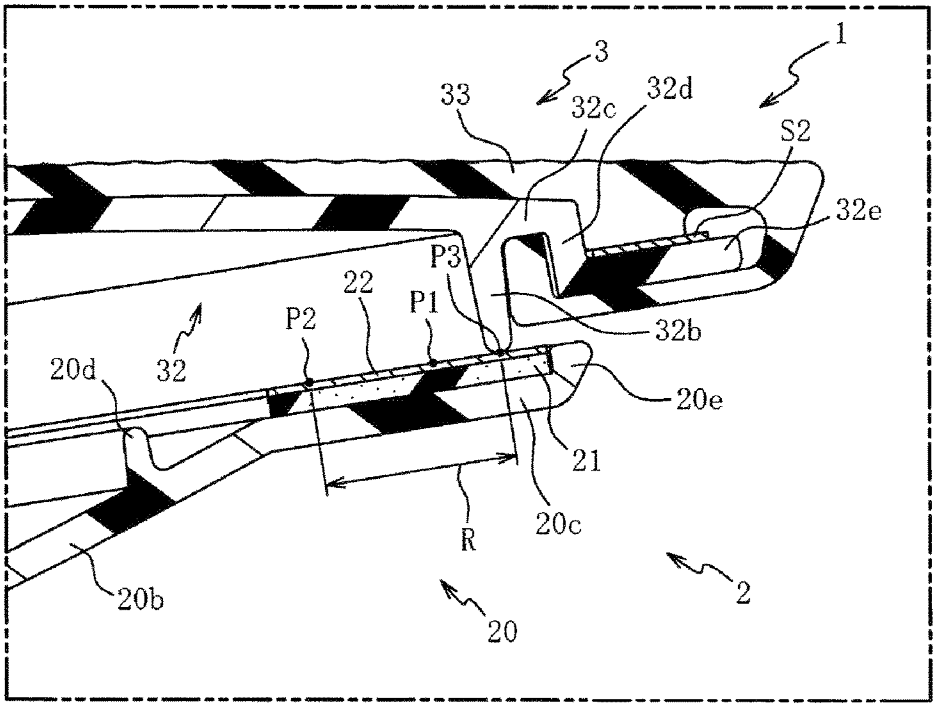

(a) of FIG. 3 is a partially enlarged cross-sectional view of the electronic hi-hat showing a state where the top cymbal is hit from the state of (b) of FIG. 2, and (b) of FIG. 3 is a partially enlarged cross-sectional view of the electronic hi-hat showing a state where a bottom cymbal and the top cymbal are displaced beyond an initial position from the state of (a) of FIG. 3.

DESCRIPTION OF THE EMBODIMENTS

Hereinafter, exemplary embodiments will be described with reference to the accompanying drawings. First, the overall configuration of an electronic hi-hat 1 will be described with reference to FIG. 1. FIG. 1 is a cross-sectional view of the electronic hi-hat 1 according to an embodiment. FIG. 1 shows a cross section cut along a plane including axes of a bottom cymbal 2 and a top cymbal 3. Further, in order to simplify the drawing, FIG. 1 omits a part of the configuration of the electronic hi-hat 1 and only shows the main parts.

As shown in FIG. 1, the electronic hi-hat 1 includes the bottom cymbal 2 and the top cymbal 3 that moves up and down on the upper side of the bottom cymbal 2, and is configured as an electronic percussion instrument that imitates an acoustic hi-hat cymbal.

The bottom cymbal 2 includes a bottom frame 20 that forms the skeleton thereof, and the bottom frame 20 is supported by a shaft 5 via a bottom support member 4. In FIG. 1, hatching is provided by omitting the detailed cross-sectional structure of the bottom support member 4. The shaft 5 is formed in a cylindrical shape and is configured to be self-supporting by a stand (not shown), and the substantially cylindrical bottom support member 4 is fixed to the upper end of the shaft 5.

The bottom support member 4 is composed of a large diameter portion 40 fixed to the shaft 5, and a small diameter portion 41 formed on the upper surface of the large diameter portion 40. The diameter of the small diameter portion 41 is formed smaller than that of the large diameter portion 40. A through hole 20*a* having a diameter smaller than that of the large diameter portion 40 of the bottom support member 4 is formed in the center of the bottom frame 20, and the small diameter portion 41 is inserted into the through hole 20*a*. As a result, the bottom frame 20 is swingably supported on the upper surface of the large diameter portion 40 of the bottom support member 4.

A rod 6 for moving the top cymbal 3 up and down is inserted into the bottom support member 4 and the shaft 5. The rod 6 moves up and down on the inner peripheral side of the bottom support member 4 and the shaft 5 by operating a step-on pedal (not shown).

A tubular member 7 having a tubular shape is attached to the upper end side of the rod 6, and a top support member 8 for swingably supporting the top cymbal 3 is fixed to the lower end side of the tubular member 7. The top support member 8 is formed in a substantially cylindrical shape, and by inserting the tubular member 7 into a through hole 31*b* formed in a head portion 31*a* of the top cymbal 3, which will be described later, the top cymbal 3 is hooked on the top support member 8.

The upper end of the top support member 8 is formed in a mountain shape, and a valley-shaped groove to be hooked on the mountain-shaped upper end of the top support member 8 is formed on the lower surface of the top cymbal 3 (head portion 31*a*). As a result, the top cymbal 3 is swingably supported by the top support member 8.

A washer 9, a pair of nuts 10, and a clutch 11 are sequentially mounted on the tubular member 7 so as to overlap with the top cymbal 3. A male screw is formed on the outer peripheral surface of the tubular member 7, and by tightening the pair of nuts 10 to press the washer 9 of an elastic member, the top cymbal 3 is swingably mounted to the tubular member 7.

The clutch 11 is fixed to the upper end of the tubular member 7, and while the tubular member 7 (top cymbal 3) is fixed to the rod 6 by tightening a wing bolt 12 from a side surface of the clutch 11 toward the rod 6, the relative position of the tubular member 7 (top cymbal 3) with respect to the rod 6 is adjusted by loosening the wing bolt 12. The rod 6 with the tubular member 7 fixed by the clutch 11 is moved up and down by depressing the pedal (not shown), and in conjunction with this, the top cymbal 3 is displaced up and down (see FIG. 2).

A top frame 30 constituting the skeleton of the top cymbal 3 is composed of a first top frame 31 supported by the top support member 8, and a second top frame 32 to which the first top frame 31 is fixed and which has an upper surface configured as a striking surface.

The first top frame 31 includes a substantially columnar head portion 31*a* formed in the central portion thereof. The through hole 31*b* that penetrates vertically is formed in the head portion 31*a*, and as described above, the tubular member 7 is inserted into the through hole 31*b*.

From the lower end of the head portion 31*a*, a flange portion 31*c* projects outward in the radial direction in a flange shape. From the outer edge of the flange portion 31*c*, a cover portion 31*d* hangs downward and projects outward in the radial direction, and the cover portion 31*d* covers the lower surface of the second top frame 32.

The second top frame 32 is formed in a disk shape having a through hole 32*a* in the center, and the head portion 31*a* of the first top frame 31 is inserted into the through hole 32*a* of the second top frame 32. In this inserted state, the flange portion 31*c* of the first top frame 31 is screwed to the inner edge portion of the second top frame 32 and the outer edge portion of the cover portion 31*d* is screwed to the lower surface of the second top frame 32, so as to form the top frame 30 in which the first top frame 31 and the second top frame 32 are integrated.

Electronic components such as an impact sensor S1 are housed in a space between the cover portion 31*d* of the first top frame 31 and the second top frame 32. The impact sensor S1 is a piezoelectric element attached to the lower surface of the second top frame 32, and vibration that occurs at the time of hitting the second top frame 32 is detected by the impact sensor S1. A hit detected by the impact sensor S1 or a pressure-sensitive sensor S2 (see FIG. 2) described later is converted into an electric signal and output to a sound source device (not shown). As a result, a musical tone corresponding to the striking position on the top cymbal 3 is generated.

The second top frame 32 is formed in a shape that gently slopes downward from the inner edge side to the outer edge side, and the upper surface of the second top frame 32 is covered by a disk-shaped cover 33 that follows this shape. A through hole 33*a* is formed in the center of the cover 33, and the head portion 31*a* of the first top frame 31 is inserted into the through hole 33*a*.

Since the material (rubber in this embodiment) of the cover 33 is softer than the material (glass fiber reinforced resin in this embodiment) of the top frame 30 (second top frame 32), the impact of hitting the second top frame 32 is absorbed by the cover 33.

Next, the detailed configuration of the electronic hi-hat 1 will be described with reference to FIG. 2 and FIG. 3. (a) of FIG. 2 is a partially enlarged cross-sectional view of the electronic hi-hat 1 in which the IIa portion of FIG. 1 is enlarged, and (b) of FIG. 2 is a partially enlarged cross-sectional view of the electronic hi-hat 1 showing a state where the top cymbal 3 is closed from the state of (a) of FIG. 2. (a) of FIG. 3 is a partially enlarged cross-sectional view of the electronic hi-hat 1 showing a state where the top cymbal 3 is hit from the state of (b) of FIG. 2, and (b) of FIG. 3 is a partially enlarged cross-sectional view of the electronic hi-hat 1 showing a state where the bottom cymbal 2 and the top cymbal 3 are displaced beyond an initial position from the state of (a) of FIG. 3.

As shown in FIG. 2, in a state where the pedal (not shown) that moves the top cymbal 3 up and down is released from depression (the state of (a) of FIG. 2), the top cymbal 3 is separated from the bottom cymbal 2, and this state is an open state. When the pedal is depressed from the open state, the top cymbal 3 displaced downward comes into contact with the bottom cymbal 2 and becomes a closed state (the state of (b) of FIG. 2).

The closed state of the top cymbal 3 caused by the depression of the pedal is detected by a displacement sensor (not shown) (which detects an upward/downward displacement amount of the top cymbal 3 caused by the upward/downward movement of the rod 6), and this detection signal is also output to the sound source device (not shown). As a result, a musical tone corresponding to the performance that closes the top cymbal 3 is generated.

Further, as shown in FIG. 3, when the top cymbal 3 is hit in the closed state (or when the top cymbal 3 comes into contact with the bottom cymbal 2 due to the displacement at the time of hitting), the bottom cymbal 2 and the top cymbal 3 swing in a state of being in contact with each other. Then, this embodiment forms a configuration in which, by smoothing the swinging of the bottom cymbal 2 and the top cymbal 3 in this way, the feeling at the time of hitting can be improved. This configuration will be described hereinafter.

As shown in FIG. 2, the bottom frame 20 of the electronic hi-hat 1 includes a bow portion 20*b* that gently slopes upward from the inner edge side to the outer edge side, an edge portion 20*c* that extends outward in the radial direction from the outer edge of the bow portion 20*b*. Each of the bow portion 20*b* and the edge portion 20*c* is formed continuously and integrally in the circumferential direction.

An annular cushion material 21 is adhered to the upper surface of the edge portion 20*c*, and an annular resin film 22 is adhered to the upper surface of the cushion material 21. The cushion material 21 is formed using foamed resin, and the resin film 22 is formed using a material having a lower friction coefficient than the cushion material 21 (cloth made of polyester in this embodiment).

The cushion material 21 and the resin film 22 are used to mitigate the impact at the time of contact (collision) between the bottom cymbal 2 and the top cymbal 3 as shown in FIG. 2, and smooth the sliding between the bottom cymbal 2 and the top cymbal 3 during swinging as shown in FIG. 3. In other words, a lightweight and flat plate shape outer edge portion of the bottom cymbal 2 and an outer edge portion of the top cymbal 3 constitute a smooth contact structure.

From the lower surface of the second top frame 32 of the top cymbal 3, a protrusion 32*b* protrudes downward toward the resin film 22, and when the top cymbal 3 is displaced, the protrusion 32*b* comes into contact (collides) with the edge portion 20*c* of the bottom frame 20 via the cushion material 21 and the resin film 22.

Because the edge portion 20*c* is formed in a flat plate shape, the outer edge portion of the bottom frame 20 is relatively lightweight. As a result, even if the hit top cymbal 3 comes into contact with the bottom frame 20, the weight of the bottom frame 20 is less likely to hinder the swinging (displacement caused by the hit) of the top cymbal 3. Since the feeling at the time of hitting the top cymbal 3 can be lightened, the feeling of hitting can be improved.

The "flat plate shape" means that both the upper and lower surfaces of the edge portion 20*c* are parallel, that is, the thickness (vertical dimension in FIG. 2) is constant from the inner edge to the outer edge of the edge portion 20*c*. Further, "constant" means that the minimum and maximum thicknesses of the edge portion 20*c* are within the range of ±30% of the average value of the thickness from the inner edge to the outer edge of the edge portion 20*c*. Thus, by not forming unevenness (voids) such as ribs on the upper surface of the edge portion 20*c* (opposing surface facing the top cymbal 3), the flatness of the upper surface of the edge portion 20*c*, that is, the flatness of the resin film 22 can be ensured. Therefore, the resin film 22 and the protrusion 32*b* as shown in FIG. 3 can slide smoothly.

In this embodiment, the thickness of the edge portion 20*c* is set to 3 mm, but the thickness of the edge portion 20*c* is preferably set to 0.5 times or more and 3 times or less of the thickness of the bow portion 20*b* of the bottom frame 20 (3 mm in this embodiment), and more preferably formed with a thickness of 2 mm or more and 4 mm or less. As a result, it is possible to reduce the weight of the edge portion 20*c* and improve the feeling of hitting while suppressing a decrease (damage) in the strength of the edge portion 20*c*.

Here, the conventional electronic hi-hat (for example, Japanese Laid-Open No. 2005-208555) has a configuration that a tube made of resin is fitted into the lower surface of the cover that covers the top frame, and the tube is brought into contact with the bottom cymbal when the top cymbal is displaced. In the case of such a configuration, in addition to that the number of parts increases, the tube may not properly contact the bottom cymbal due to elastic deformation of the cover.

In contrast thereto, in this embodiment, the protrusion 32*b* integrally formed with the second top frame 32 protrudes downward with respect to the lowermost surface of the cover 33, and the protrusion 32*b* is in contact with the edge portion 20*c* of the bottom frame 20 (via the cushion material 21 and the resin film 22). As a result, the number of parts of the electronic hi-hat 1 can be reduced. Further, unlike the configuration in which the tube is fitted into the cover 33, the protrusion 32*b* is not affected by the elastic deformation of the cover 33. Therefore, the protrusion 32*b* can be properly brought into contact with the resin film 22, so the sliding between the protrusion 32*b* and the resin film 22 can be effectively performed.

On the other hand, in the case where the protrusion 32*b* is integrally formed with the second top frame 32, since the rigidity of the protrusion 32*b* is relatively high, for example, when the protrusion 32*b* directly comes into contact (collides) with the edge portion 20*c*, the impact is large. Therefore, there arise the problems that the collision sound at the time of such contact is loud and the flat plate-shaped edge portion 20*c* is easily damaged. In addition, when the bottom cymbal 2 and the top cymbal 3 slide as shown in FIG. 3, the protrusion 32*b* and the edge portion 20*c* are easily worn.

In contrast thereto, in this embodiment, the cushion material 21 softer than the edge portion 20*c* is laminated on the edge portion 20*c*, and the resin film 22 having a lower friction coefficient than the cushion material 21 is laminated on the cushion material 21. As a result, the impact at the time of contact (collision) between the bottom cymbal 2 and the top cymbal 3 as shown in FIG. 2 can be mitigated by the cushion material 21, so the collision sound at the time of such contact can be reduced, and even when the edge portion 20*c* is formed in a flat plate shape, damage to the edge portion 20*c* can be suppressed. Further, when the bottom cymbal 2 and the top cymbal 3 slide as shown in FIG. 3, since the sliding can be smoothed by the resin film 22, it is possible to prevent the protrusion 32*b* and the edge portion 20*c* from being worn.

That is, the configuration in which the cushion material 21 and the resin film 22 are provided at the contact portion between the bottom frame 20 and the second top frame 32 is particularly effective when the protrusion 32*b* integrally formed with the second top frame 32 is brought into contact with the flat plate-shaped edge portion 20*c*.

The second top frame 32 includes an outer peripheral portion 32*c* that extends to the outer peripheral side (right side in FIG. 2) with respect to the protrusion 32*b*, a bent portion 32*d* that bends downward from the outer edge of the outer peripheral portion 32*c*, and an overhanging portion 32*e* that projects from the lower end of the bent portion 32*d* to the outer peripheral side. Each of these parts constitutes the edge (outer edge) portion of the second top frame 32. Each of the outer peripheral portion 32*c*, the bent portion 32*d*, and the overhanging portion 32*e* is formed continuously and integrally in the circumferential direction.

The annular pressure-sensitive sensor S2 is attached to the upper surface of the overhanging portion 32*e*, and the pressure-sensitive sensor S2 is covered with the cover 33. When the edge portion of the second top frame 32 (cover 33) is hit, the pressure-sensitive sensor S2 is pressed by the cover 33. As a result, the hit on the edge portion of the top cymbal 3 is detected.

The outer edge portion of the cover 33 is folded downward so as to cover the outer peripheral surface and the lower surface of the overhanging portion 32*e*, and the inner edge of the folded portion is inserted between the protrusion 32*b* and the bent portion 32*d* of the second top frame 32. As a result, in addition to the function of smoothing the sliding at the time of contact with the bottom cymbal 2, the protrusion 32*b* can have a function of fixing the outer edge portion of the cover 33.

Here, as described above, the protrusion 32*b* of the second top frame 32 protrudes downward with respect to the lowermost surface of the cover 33, and in the state where the top cymbal 3 is closed, the protrusion 32*b* is in contact with the resin film 22. This contact position is defined as an initial position P1 (see (b) of FIG. 2). As shown in FIG. 3, when the top cymbal 3 hit in the closed state tilts downward together with the bottom cymbal 2, the contact position of the protrusion 32*b* slides to a portion P2 on the inner edge side of the resin film 22 with respect to the initial position P1. This is because the swing fulcrum of the bottom cymbal 2 and the swing fulcrum of the top cymbal 3 are vertically separated from each other.

In addition, depending on the striking power to the top cymbal 3, when the bottom cymbal 2 and the top cymbal 3 tilting downward return to the initial state, they may tilt upward beyond the initial state as shown in (b) of FIG. 3. At this time, the contact position of the protrusion 32*b* slides to a portion P3 on the outer edge side of the resin film 22 with respect to the initial position P1.

That is, when the top cymbal 3 swings during hitting in the closed state, the protrusion 32*b* comes into contact with the bottom cymbal 2 (resin film 22) in a contact range R (predetermined range) from the portion P2 on the inner edge side to the portion P3 on the outer edge side of the bottom cymbal 2 (resin film 22). Then, the edge portion 20*c* is formed in a flat plate shape over a range wider than the contact range R. Thus, the edge portion 20*c* is formed in a flat plate shape over the entire contact range R where the top cymbal 3 (protrusion 32*b*) can come into contact to reduce the weight, so that the feeling at the time of hitting the top cymbal 3 can be effectively improved.

Further, in order to smooth (stabilize) the sliding between the resin film 22 and the protrusion 32*b* as shown in FIG. 3, it is preferable to make the tip of the protrusion 32*b* constantly in contact with the resin film 22. Therefore, in this embodiment, each of the edge portion 20*c*, the cushion material 21, and the resin film 22 is formed in a flat plate shape (the resin film 22 has a film shape) extending in a direction orthogonal to the protruding direction of the protrusion 32*b*. As a result, the tip of the protrusion 32*b* can be constantly slid on the upper surface of the resin film 22, so that the sliding can be smoothed.

An inner protrusion 20*d* protrudes upward from the upper surface of the bottom frame 20 on the inner peripheral side with respect to the edge portion 20*c*, and the inner protrusion 20*d* is formed in an annular shape that is continuous over the entire circumference of the bottom frame 20. As a result, the vicinity of the edge portion 20*c* can be reinforced by the inner protrusion 20*d*. Further, by forming the inner protrusion 20*d* in the vicinity of the edge portion 20*c*, it is possible to suppress the edge portion 20*c* from being distorted due to heat shrinkage when the bottom frame 20 made of resin is molded. By suppressing the distortion of the edge portion 20*c*, the flatness of the upper surface of the edge portion 20*c*, that is, the flatness of the resin film 22 can be ensured, so that the sliding between the resin film 22 and the protrusion 32*b* as shown in FIG. 3 can be smoothed.

An outer protrusion 20*e* protrudes upward from the outer edge of the edge portion 20*c*, and the outer protrusion 20*e* is formed in an annular shape along the outer peripheral surfaces of the cushion material 21 and the resin film 22. As a result, the outer peripheral surfaces of the cushion material 21 and the resin film 22 can be covered with the outer protrusion 20*e*, so that the design of the electronic hi-hat 1 can be improved.

Further, by forming the outer protrusion 20*e* on the outer edge portion of the edge portion 20*c*, the edge portion 20*c* can be surrounded by the inner protrusion 20*d* and the outer protrusion 20*e* over the entire circumference in the circumferential direction. As a result, it is possible to more effectively suppress the distortion in the edge portion 20*c* due to the above-mentioned heat shrinkage.

As described above, in order to suppress the distortion in the edge portion 20*c*, it is preferable to form each of the inner protrusion 20*d* and the outer protrusion 20*e* in an annular shape that is continuous in the circumferential direction. On the other hand, if the inner protrusion 20*d* and the outer protrusion 20*e* are formed in an annular shape that is continuous (complete without a gap) in the circumferential direction, when the bottom frame 20 is distorted (bent) by the load applied at the time of hitting, etc., there is no escape field for stress and the generated distortion cannot be absorbed, and as a result, the stress may be concentrated on the tips of the inner protrusion 20*d* and the outer protrusion 20*e* and cause cracks.

In contrast thereto, in this embodiment, the bottom frame 20 is formed using fiber reinforced resin (glass fiber reinforced resin in this embodiment). As a result, even when the inner protrusion 20*d* and the outer protrusion 20*e* are formed in an annular shape, it is possible to suppress cracking of the inner protrusion 20*d* and the outer protrusion 20*e* due to the distortion (bending) of the bottom frame 20.

Further, since the bottom frame 20 is formed using fiber reinforced resin, the strength of the edge portion 20*c* can also be secured. As a result, even when the edge portion 20*c* is formed in a flat plate shape (thin), it is possible to prevent the edge portion 20*c* from being damaged by contact (collision) with the top cymbal 3. In other words, by forming the bottom frame 20 using fiber reinforced resin, as in the conventional electronic hi-hat (for example, Japanese Laid-Open No. 2005-208555), the edge portion of the bottom frame 20 can be formed in a flat plate shape (thin) without using a metal plate in the portion in contact with the top cymbal 3 or reinforcing with ribs or the like. Therefore, the number of parts can be reduced to reduce the product cost of the electronic hi-hat 1, and the weight increase of the bottom frame 20 can be suppressed to improve the feeling at the time of hitting.

Although the disclosure has been described based on the above embodiments, the disclosure is not limited to the above embodiments, and it can be easily inferred that various improvements and modifications can be made without departing from the gist of the disclosure.

The above embodiment illustrates that the portion of the bottom frame 20 located in the contact range R with the top cymbal 3 is configured as the flat plate-shaped edge portion 20*c*, but the disclosure is not necessarily limited thereto. For example, the bottom frame 20 may be formed in a flat plate shape in a range narrower than the contact range R.

The above embodiment illustrates that the cushion material 21 and the resin film 22 are laminated on the edge portion 20*c*, but the disclosure is not necessarily limited thereto. For example, in addition to the cushion material 21 and the resin film 22, other members such as a metal plate may be attached to the edge portion 20*c*. Further, the cushion material 21 and the resin film 22 may be omitted, and the edge portion 20*c* may be brought into direct contact with the top frame 30 (second top frame 32).

The above embodiment illustrates that the protrusion 32*b* protruding toward the edge portion 20*c* is formed integrally with the top frame 30 (second top frame 32), but the disclosure is not necessarily limited thereto. For example, as in the conventional electronic hi-hat, a tube made of resin may be fitted into the lower surface of the top frame 30 (second top frame 32) or the cover 33, and the tube may be brought into contact with the bottom frame 20. Further, instead of bringing the protrusion 32*b* into contact with the bottom frame 20, the top frame 30 (second top frame 32) and the bottom frame 20 may be brought into contact with each other at the surfaces.

The above embodiment illustrates that the top frame 30 includes the first top frame 31 and the second top frame 32, but the disclosure is not necessarily limited thereto. For example, the top frame 30 may be composed of one or three or more frames.

The above embodiment illustrates that the inner protrusion 20*d* is provided on the inner peripheral side of the edge portion 20*c* of the bottom frame 20 and the outer protrusion 20*e* is provided on the outer peripheral side of the edge portion 20*c*, but the disclosure is not necessarily limited thereto. For example, either one or both of the inner protrusion 20*d* and the outer protrusion 20*e* may be omitted.

The above embodiment illustrates that the inner protrusion 20*d* and the outer protrusion 20*e* are formed in an annular shape (formed continuously in the circumferential direction), but the disclosure is not necessarily limited thereto. For example, the inner protrusion 20*d* or the outer protrusion 20*e* may be formed intermittently in the circumferential direction of the bottom frame 20 (for example, the inner protrusion 20*d* extending in the radial direction is formed radially). With this configuration, when the bottom frame 20 is distorted (bent) by the load at the time of hitting, an escape field for the stress can be generated (the generated distortion is absorbed). Since the stress can be prevented from being concentrated on the inner protrusion 20*d* and the outer protrusion 20*e*, cracking of the inner protrusion 20*d* and the outer protrusion 20*e* can be suppressed.

The above embodiment illustrates that each frame of the bottom frame 20 and the top frame 30 (first top frame 31 and second top frame 32) is formed using glass fiber reinforced resin, but the disclosure is not necessarily limited thereto. For example, each frame may be formed using fiber reinforced resin reinforced with other fibers such as carbon fibers or other synthetic resin (for example, ABS resin or super engineering plastic) containing no fiber. That is, the material constituting each frame is not limited to the above-mentioned forms.

The above embodiment illustrates that the edge portion 20*c*, the cushion material 21, and the resin film 22 are formed in a flat plate shape extending in the direction orthogonal to the protruding direction of the protrusion 32*b* of the top frame 30 (second top frame 32), but the disclosure is not necessarily limited thereto. For example, the edge portion 20*c*, the cushion material 21, and/or the resin film 22 may be inclined with respect to the direction orthogonal to the protruding direction of the protrusion 32*b*.

The above embodiment illustrates that the entire bottom frame 20 is formed using fiber reinforced resin, but the disclosure is not necessarily limited thereto. For example, only the edge portion 20*c* of the bottom frame 20 may be formed using fiber reinforced resin.

What is claimed is:

1. An electronic hi-hat having a radial direction and a circumferential direction, comprising:
- a bottom cymbal that is swingably attached to a first rod; and
- a top cymbal that is arranged on an upper side of the bottom cymbal and is swingably attached to a second rod which is relatively displaced up and down with respect to the first rod,
- wherein the bottom cymbal comprises a first frame that forms a skeleton of the bottom cymbal, and the first frame is formed continuously and integrally in the radial direction and the circumferential direction,
- the first frame comprises:
  - a bow portion;
  - a contact portion which is an edge portion formed in a flat plate shape over a contact range where the top cymbal comes into contact when the top cymbal is displaced; and
  - an inner protrusion that protrudes from a portion on an inner peripheral side with respect to the contact portion toward the top cymbal,
- wherein the contact portion continuously and integrally extends outward in the radial direction from the bow portion, and the bow portion and the contact portion are formed continuously and integrally in the circumferential direction of the first frame,
- wherein an upper surface and a lower surface of the contact portion are parallel, and a thickness of the contact portion in a vertical dimension is constant from an inner edge to an outer edge of the contact portion,
- wherein when the top cymbal comes into contact with the bottom cymbal due to a displacement at a time of hitting, the bottom cymbal and the top cymbal swing in a state of being in contact with each other,
- wherein when the electronic hi-hat is not hit, the flat plate shape of the contact portion is positioned in a direction substantially perpendicular to an axial direction of the first rod,
- wherein a bottom surface of the first frame has an angle between the contact portion and the bow portion, and
- the angle is positioned between the inner protrusion and the contact portion.

2. The electronic hi-hat according to claim 1, wherein
- a surface of the contact portion facing the top cymbal is formed in a flat shape having no unevenness.

3. The electronic hi-hat according to claim 1, wherein
- a range for contact with the top cymbal from an inner edge side to an outer edge side of the first frame when the top cymbal swings with respect to the second rod is configured as the contact portion having the flat plate shape.

4. The electronic hi-hat according to claim 1, wherein
- the bow portion constitutes a portion on an inner peripheral side with respect to the contact portion, and
- the contact portion is formed with a thickness that is 0.5 times or more and 3 times or less a thickness of the bow portion.

5. The electronic hi-hat according to claim 1, wherein
the top cymbal comprises a second frame that forms a skeleton of the top cymbal,
the second frame comprises a protrusion that protrudes toward the contact portion and is formed integrally with the second frame, and
the protrusion and the contact portion come into contact with each other when the top cymbal is displaced.

6. The electronic hi-hat according to claim 5, wherein the bottom cymbal comprises:
a cushioning material that is laminated on the contact portion and is softer than the contact portion, and
a low friction material that is laminated on the cushioning material and has a lower friction coefficient than the cushioning material,
wherein the protrusion and the contact portion come into contact with each other via the cushioning material and the low friction material.

7. The electronic hi-hat according to claim 6, wherein
the contact portion, the cushioning material, and the low friction material are formed in the flat plate shape that extends in a direction orthogonal to a protruding direction of the protrusion.

8. The electronic hi-hat according to claim 1, wherein
at least the contact portion of the first frame is formed using fiber reinforced resin.

9. An electronic hi-hat having a radial direction and a circumferential direction, comprising:
a bottom cymbal, having a first frame that forms a skeleton of the bottom cymbal, and being swingably attached to a first rod, and the first frame is formed continuously and integrally in the radial direction and the circumferential direction; and
a top cymbal, that is arranged on an upper side of the bottom cymbal and is swingably attached to a second rod which is relatively displaced up and down with respect to the first rod,
wherein a lightweight outer edge portion of the bottom cymbal and an outer edge portion of the top cymbal constitute a smooth contact structure,
the first frame comprises:
a bow portion;
a contact portion which is the lightweight outer edge portion formed in a flat plate shape over a contact range where the top cymbal comes into contact when the top cymbal is displaced; and
an inner protrusion that protrudes from a portion on an inner peripheral side with respect to the contact portion toward the top cymbal,
wherein the contact portion continuously and integrally extends outward in the radial direction from the bow portion, and the bow portion and the contact portion are formed continuously and integrally in the circumferential direction of the first frame,
wherein an upper surface and a lower surface of the contact portion are parallel, and a thickness of the contact portion in a vertical dimension is constant from an inner edge to an outer edge of the contact portion,
wherein when the top cymbal comes into contact with the bottom cymbal due to a displacement at a time of hitting, the bottom cymbal and the top cymbal swing in a state of being in contact with each other,
wherein when the electronic hi-hat is not hit, the flat plate shape of the contact portion is positioned in a direction substantially perpendicular to an axial direction of the first rod,
wherein a bottom surface of the first frame has an angle between the contact portion and the bow portion, and
the angle is positioned between the inner protrusion and the contact portion.

10. An operating method of an electronic hi-hat having a radial direction and a circumferential direction, which comprises a bottom cymbal that is swingably attached to a first rod, and a top cymbal that is arranged on an upper side of the bottom cymbal and is swingably attached to a second rod which is relatively displaced up and down with respect to the first rod,
wherein the bottom cymbal comprises a first frame that forms a skeleton of the bottom cymbal, and the first frame is formed continuously and integrally in the radial direction and the circumferential direction,
the first frame comprises:
a bow portion;
a contact portion which is an edge portion formed in a flat plate shape over a contact range where the top cymbal comes into contact when the top cymbal is displaced; and
an inner protrusion that protrudes from a portion on an inner peripheral side with respect to the contact portion toward the top cymbal,
wherein the contact portion continuously and integrally extends outward in the radial direction from the bow portion, and the bow portion and the contact portion are formed continuously and integrally in the circumferential direction of the first frame,
wherein an upper surface and a lower surface of the contact portion are parallel, and a thickness of the contact portion in a vertical dimension is constant from an inner edge to an outer edge of the contact portion,
wherein when the top cymbal comes into contact with the bottom cymbal due to a displacement at a time of hitting, the bottom cymbal and the top cymbal swing in a state of being in contact with each other,
wherein when the electronic hi-hat is not hit, the flat plate shape of the contact portion is positioned in a direction substantially perpendicular to an axial direction of the first rod,
wherein a bottom surface of the first frame has an angle between the contact portion and the bow portion, and
the angle is positioned between the inner protrusion and the contact portion.

11. The operating method of an electronic hi-hat according to claim 10, wherein
a surface of the contact portion facing the top cymbal is formed in a flat shape having no unevenness.

12. The operating method of an electronic hi-hat according to claim 10, wherein
a range for contact with the top cymbal from an inner edge side to an outer edge side of the first frame when the top cymbal swings with respect to the second rod is configured as the contact portion having the flat plate shape.

13. The operating method of an electronic hi-hat according to claim 10, wherein
the bow portion constitutes a portion on an inner peripheral side with respect to the contact portion, and
the contact portion is formed with a thickness that is 0.5 times or more and 3 times or less a thickness of the bow portion.

14. The operating method of an electronic hi-hat according to claim 10, wherein
the top cymbal comprises a second frame that forms a skeleton of the top cymbal, the second frame comprises a protrusion that protrudes toward the contact portion and is formed integrally with the second frame, and the protrusion and the contact portion come into contact with each other when the top cymbal is displaced.

15. The operating method of an electronic hi-hat according to claim 14, wherein the bottom cymbal comprises:

a cushioning material that is laminated on the contact portion and is softer than the contact portion, and a low friction material that is laminated on the cushioning material and has a lower friction coefficient than the cushioning material, wherein the protrusion and the contact portion come into contact with each other via the cushioning material and the low friction material.

16. The operating method of an electronic hi-hat according to claim 15, wherein the contact portion, the cushioning material, and the low friction material are formed in the flat plate shape that extends in a direction orthogonal to a protruding direction of the protrusion.

17. The operating method of an electronic hi-hat according to claim 10, wherein the first frame comprises an outer protrusion that protrudes from a portion on an outer peripheral side with respect to the contact portion toward the top cymbal, and the contact portion is surrounded by the inner protrusion and the outer protrusion that extend over an entire circumference of the first frame.

18. The operating method of an electronic hi-hat according to claim 10, wherein at least the contact portion of the first frame is formed using fiber reinforced resin.

19. The electronic hi-hat according to claim 1, wherein the thickness of the contact portion in the vertical dimension is constant from the inner edge to the outer edge of the contact portion, wherein minimum and maximum of the thicknesses of the contact portion are within a range of ±30% of an average value of the thickness from the inner edge to the outer edge of the contact portion.

20. The electronic hi-hat according to claim 1, wherein a bottom surface of first frame at the edge portion is substantially parallel with a contact surface opposite to the bottom surface of the first frame.

* * * * *